June 15, 1954
M. B. COLE
2,681,400
SAFETY DEVICE FOR WELDERS
Filed May 12, 1951
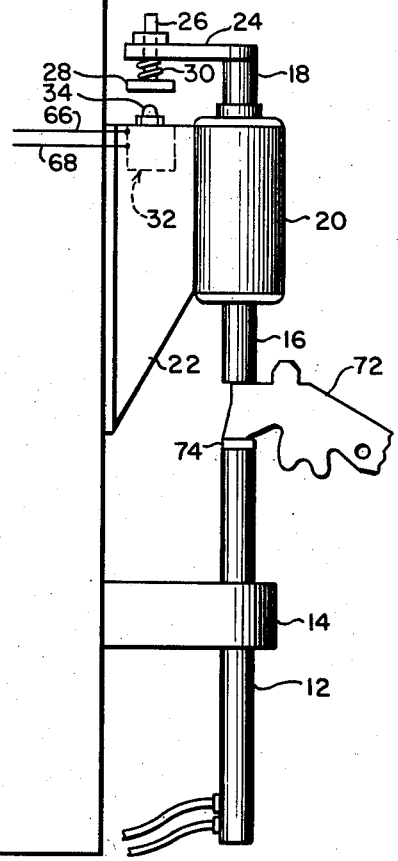
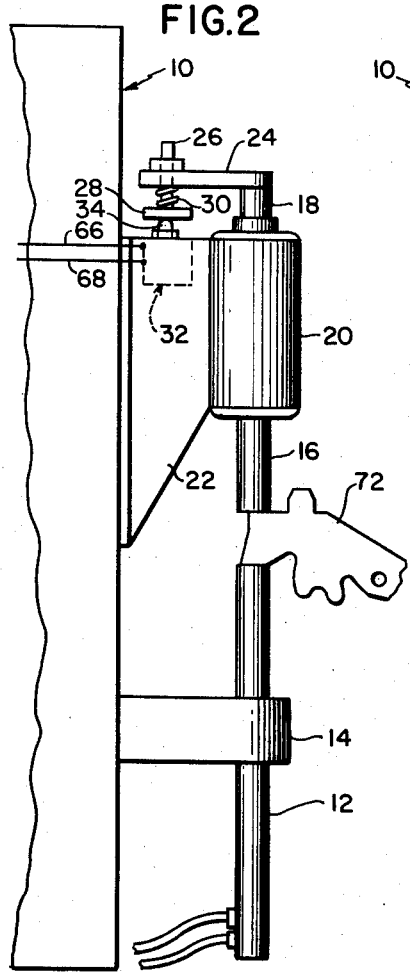
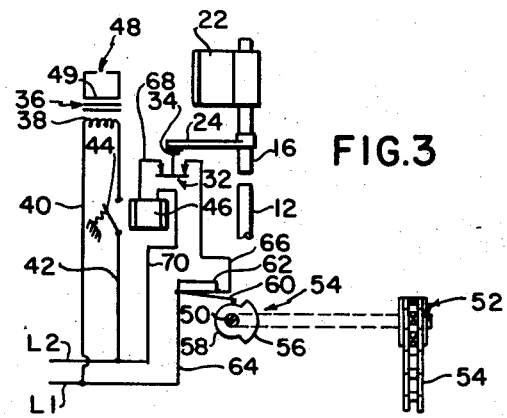
INVENTOR.
Melvin B. Cole
BY Edwin Lerrol
Harry Cole
ATTORNEYS Patented June 15, 1954

2,681,400

UNITED STATES PATENT OFFICE 2,681,400

SAFETY DEVICE FOR WELDERS

Melvin B. Cole, Forest Hills, N. Y., assignor to Federal Electric Products Company, Newark, N. J., a corporation of Delaware Application May 12, 1951, Serial No. 226,044

2 Claims. (Cl. 219—4)

The present invention relates generally to automatic electric spot welders, and in particular to a safety device therefor.

In the operation of an automatic electric spot welder in connection with a conveyor which automatically positions two articles, which are to be welded together, on the stationary electrode of the welder, either or both of the articles may fail to arrive at the welder. In the latter event, the operation of the welder may result in the pitting of the electrode faces and, in addition, if only one article is at the welder, it may be moved by the reciprocating welder electrode against the part of the conveyor used to carry the missing article and be welded thereto.

In the application of David Wallace Alcott, for Machine for Making Sub-assemblies for Automatic Circuit Breakers, Serial Number 225,953, filed concurrently herewith on May 12, 1951, and assigned to the assignee hereof, mechanism is disclosed for automatically positioning a movable switch member and electric contact therefor at an automatic spot welder for welding the contact to the switch member. In the event that the electric contact is not in position below the switch member, at the welder, the switch member may be moved by the reciprocating welder electrode, against the conveyor part which ordinarily holds the electric contact and be welded thereto.

Therefore, it is an object of the present invention to provide means for preventing the welding operation in an automatic welder in the event that either or both of the articles, which are to be welded together, is not in position between the welding electrodes.

Another object is to interrupt the welding current supply in an automatic welder in response to overtravel of the reciprocating electrode thereof.

The above and other objects, features and advantages of the present invention will be more fully understood from the following description considered in connection with the accompanying illustrative drawings.

In the drawings:

Fig. 1 is a view, in elevation, showing the electrodes of an automatic electric spot welder provided with the safety device of the present invention, two articles being illustrated in position for the welding thereof;

Fig. 2 is a view similar to Fig. 1 illustrating the disposition of the electrodes during a welding operation, with only one of the articles in position at the welder; and Fig. 3 is a wiring diagram of the welding current circuit pursuant to the present invention.

Referring now to the drawings in detail, an electric spot welder of known construction is generally indicated by the reference numeral 10. Said welder is provided with the usual stationary electrode 12 mounted thereon as by the bracket 14, and with the usual companion electrode 16 mounted for vertical reciprocation relative to the electrode 12. The electrode 16 is carried for said movement by a piston 18 which is mounted for movement relative to the welding cylinder 20. As here shown, the welding cylinder 20 is secured by a bracket 22 to the welding unit 10.

Pursuant to the present invention, the piston 18 is provided with a laterally extending arm 24 which carries a plunger 26 at the free end thereof. At its lower end, the plunger is provided with an enlarged head 28, a compression spring 30 being mounted on the plunger between the arm 24 and the head 28. A normally closed switch 32, preferably a microswitch, is conveniently mounted on the bracket 22 immediately below, and in the path of movement of the plunger head 28. Said switch is provided with a depressible operating element 34 adapted to be engaged by the plunger head 28, as hereinafter described, for opening the switch.

The circuit for supplying the welding current is illustrated in Fig. 3. As there shown, the welding transformer is indicated at 36, the primary 38 of said transformer being connected to the power line L1 through the lead 40 and being connected to the power line L2 through the lead 42. The armature 44 of the relay 46 is connected in series in the lead 42 for making and breaking the energizing circuit of the transformer 36, as is well known to those skilled in the art. The secondary of the welding transformer comprises the welding horn 48 which is constituted by the companion welding electrodes 12 and 16, which are interconnected as at 49.

As illustrated and described in detail in said co-pending application, provision is made to complete the welding current circuit when the work to be welded is in position in the welding horn 48. More specifically, and as here shown, provision is made for a cam shaft 50 which is mounted for continuous rotation in a suitable manner. As here shown, said shaft is provided with a sprocket wheel 52 which is rotated by the sprocket chain 54. It will be understood that the sprocket chain is driven by a companion sprocket wheel which, in turn, is driven by a suitable prime mover (not illustrated) during the operation of the mechanism, for driving the sprocket wheel 52 and the cam shaft 50. A cam 54 is carried by the shaft 50 and is provided with a high dwell 56 and a low dwell portion 58. As here shown, the operating element 60 of a normally open microswitch 62 rides on the periphery of the cam 54. It will be understood that when the element 60 rides on the high dwell 56, the microswitch 62 will be closed for energizing the welding transformer, and when said element rides on the low dwell 58, the energizing circuit for the welding transformer will be opened. More specifically, the microswitch 62 is connected to the power line L1 through the lead 64 and is connected to the aforementioned switch 32 through the lead 66. The switch 32 is connected to the relay 46 through a lead 68, and the relay is connected to the power line L2 through the lead 70. Therefore, it will be apparent that when the microswitch 62 is closed by the operation of the cam 54, the relay 46 will be energized so that the armature 44 thereof will close the primary circuit of the welding transformer 36 to supply the welding current to the electrodes of the welding horn 48. The welding operation will now take place. It will be understood that the welding operation will be terminated when the microswitch 62 is opened in response to the movement of the cam 54 to deenergize the relay 46.

As previously indicated, in the present embodiment thereof, applicant's invention is presently used in an apparatus for assembling the sub-assembly of an automatic circuit breaker, as fully illustrated and described in the above identified co-pending application. The circuit breaker is provided with a movable switch member 72 and with an electric contact 74 which is to be welded thereto. As described in said co-pending application, to switch member and the electric contact are automatically disposed on the stationary electrode 12, as illustrated in Fig. 1 for the welding operation. As the electrode 16 descends to engage the underlying portion of the movable switch member, the cam 54 operates to complete the welding current circuit to provide for the flow of current through the welding horn 48. It will be apparent that the arm 24 carried by the piston 18, moves downwardly with the piston and the reciprocating electrode 16 when the latter moves to engage the movable switch member 72. The head 28 is so spaced from the switch element 34 that with the movable switch member and the electric contact both in position on the stationary electrode 12, the reciprocating electrode 16 will engage the underlying portion of the movable switch member before the head 28 on the plunger 26 has moved downwardly a sufficient distance to engage and operate the operating member 34 of the microswitch 32. Therefore, it will be apparent that when the downward movement of the electrode 16 is discontinued by the engagement thereof with the movable switch member 72, the switch 32 will not have been operated by the head 28 and the welding operation will be performed.

In the event that either the electric contact 74 or the movable switch member 72, or both, is not positioned on the stationary electrode 12, it will be apparent that the movable electrode 16 will travel through a longer downward stroke than that previously described. This longer downward stroke is sufficient to carry the head 28 into engagement with the switch operating element 34 for operating a switch 32 to open the latter for preventing the energization of the relay 46 through the operation of the cam 54. Consequently, the current will not be supplied to the welding horn 48 for the welding operation.

The overtravel of the welding electrode 16 beyond its normal predetermined stroke when both the movable switch member and the electric contact are in position on the stationary electrode 12, is illustrated in Fig. 2. In this figure it will be noted that the contact 74 is not in position on the stationary electrode 12. Therefore, it will be apparent that the movable switch member 72 will be carried downwardly from the normal position thereof between the welding electrodes, by the movable electrode 16 for a distance substantially equal to the thickness of the contact 74 before the stroke of said electrode is terminated. The overtravel of the electrode 16 corresponding substantially to the thickness of the electric contact 74, is sufficient to carry the head 28 into engagement with the element 34 to operate the switch 32 to the open condition thereof. Therefore, it will be apparent that the relay 46 will be de-energized and the welding current will not be present in the welding horn 48 to complete the welding operation.

While my invention has been illustrated and described in connection with the welding of an electric contact to a movable switch member in the apparatus of the co-pending application above identified, it will be apparent that its use is not limited thereto and that it is applicable for preventing the welding operation wherever at least one of a pair of items to be welded is not in position in the welding horn.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent, is:

1. In an automatic electric welder, a stationary electrode, a welding cylinder provided with a piston mounted therein and carrying an electrode for reciprocation toward and away from said stationary electrode, a support member mounting said cylinder on the welder, a normally closed switch mounted on said support member and provided with a projecting operating member, a normally open circuit including said switch, said circuit being operable when closed to supply welding current to the electrodes, and including a normally de-energized relay, means for intermittently closing said circuit for energizing said relay and circuit means operable upon energization of said relay to supply welding current to said electrodes, and a laterally extending member provided on said piston and overlying said operating member, the distance between said laterally extending member and said operating member being predetermined in accordance with the predetermined distance of travel of said reciprocating electrode for initial engagement with work normally disposed between said electrodes, whereby upon the travel of said reciprocating electrode toward said stationary electrode beyond said predetermined travel distance thereof said laterally extending member will engage said operating member to open said switch for de-energizing said relay and discontinuing the supply of welding current.

2. In an automatic electric welder, a stationary electrode, a welding cylinder provided with a piston mounted therein and carrying an electrode for reciprocation toward and away from said stationary electrode, a support member mounting said cylinder on the welder, a normally closed switch mounted on said support member and provided with a projecting operating member, a normally open circuit including said switch, said circuit being operable when closed to supply welding current to the electrodes, and including a normally de-energized relay, means for intermittently closing said circuit for energizing said relay and circuit means operable upon energization of said relay to supply welding current to said electrodes, and a laterally extending member provided on said piston and overlying said operating member, the distance between said laterally extending member and said operating member being predetermined in accordance with the predetermined distance of travel of said reciprocating electrode for initial engagement with work normally disposed between said electrodes, whereby upon the travel of said reciprocating electrode toward said stationary electrode beyond said predetermined travel distance thereof said laterally extending member will engage said operating member to open said switch for de-energizing said relay and discontinuing the supply of welding current, said intermittent closing means including a normally open switch in said circuit and mechanism operable to close said latter switch upon movement of said reciprocating electrode toward said stationary electrode.

References Cited in the file of this patent

UNITED STATES PATENTS

| Number | Name | Date |
|---|---|---|
| 1,613,957 | Madden | Jan. 11, 1927 |
| 1,938,499 | Ragsdale | Dec. 5, 1933 |
| 1,967,094 | Lincoln | July 17, 1934 |
| 2,066,791 | McBain | Jan. 5, 1937 |
| 2,253,702 | Hall | Aug. 26, 1941 |
| 2,494,847 | Welch | Jan. 17, 1950 |
| 2,571,313 | Tucker | Oct. 16, 1951 |